(12) United States Patent
Simmons et al.

(10) Patent No.: US 10,301,769 B2
(45) Date of Patent: May 28, 2019

(54) STRETCHABLE FIBER-BASED COMPOSITE-MATERIAL

(71) Applicant: Carbitex, Inc., Kennewick, WA (US)

(72) Inventors: Kevin Lynn Simmons, Kennewick, WA (US); Tyler Andre Kafentzis, Kennewick, WA (US); Junus Ali Khan, Pasco, WA (US)

(73) Assignee: Carbitex, Inc., Kennewick, WA (US)

( * ) Notice: Subject to any disclaimer, the term of this patent is extended or adjusted under 35 U.S.C. 154(b) by 484 days.

(21) Appl. No.: 15/135,455

(22) Filed: Apr. 21, 2016

(65) Prior Publication Data
US 2016/0312398 A1    Oct. 27, 2016

Related U.S. Application Data

(60) Provisional application No. 62/151,236, filed on Apr. 22, 2015.

(51) Int. Cl.
| | | |
|---|---|---|
| *D06M 15/19* | (2006.01) |
| *C08J 5/04* | (2006.01) |
| *D06N 7/00* | (2006.01) |
| *D06M 101/40* | (2006.01) |

(52) U.S. Cl.
CPC ............... *D06M 15/19* (2013.01); *C08J 5/04* (2013.01); *D06N 7/00* (2013.01); *D06M 2101/40* (2013.01); *D06N 2209/1635* (2013.01)

(58) Field of Classification Search
CPC ............. D06M 15/19; D06M 2101/40; D06M 2209/1635; C08J 5/04; D06N 7/00
See application file for complete search history.

(56) References Cited

U.S. PATENT DOCUMENTS

| 4,623,574 A | 11/1986 | Harpell et al. |
| 2007/0042170 A1* | 2/2007 | Morin ............... D03D 15/00 |
| | | 428/292.1 |

FOREIGN PATENT DOCUMENTS

| DE | 10103054 C1 | 1/2002 |
| WO | 2015065460 A1 | 5/2015 |

OTHER PUBLICATIONS

International Searching Authority, International Search Report and Written Opinion, PCT Application PCT/US2016/028706, dated Aug. 11, 2016, 13 pages.

* cited by examiner

*Primary Examiner* — Cephia D Toomer
(74) *Attorney, Agent, or Firm* — Perkins Coie LLP (57) ABSTRACT

An axially stretchable fiber-reinforced composite material, comprising an elastically deformable matrix having a low modulus of elasticity, and a fabric core encapsulated by the matrix. The core comprises first fibers interlaced with second fibers, with the first fibers being in a non-parallel orientation relative to the material's longitudinal axis, and the second fibers are non-parallel relative to the first fibers when the composite material is in a retracted position. The composite material is stretchable between the retracted and extended positions. The fibers have a high modulus of elasticity. The composite material has a non-linear modulus relative to elongation of the composite material between the retraced and extended positions. Movement of the material toward the extended position causes the first and second fibers to rotate relative to each other and in a direction toward alignment with the longitudinal axis, and the matrix material biases the composite material toward the retracted position.

20 Claims, 9 Drawing Sheets

STRETCHABLE FIBER-BASED COMPOSITE-MATERIAL

CROSS-REFERENCE TO RELATED APPLICATION

This non-provisional patent application claims priority to and the benefit of U.S. Provisional Patent Application No. 62/151,236, titled Composite-Material Cables and Straps, filed Apr. 22, 2015, which is incorporated herein in its entirety by reference thereto.

TECHNICAL FIELD

This patent application is directed to composite materials, and in particular to fiber-based composite material usable as cables, sheaths, and straps.

BACKGROUND

Currently, cabling and straps are primarily made from metal or polymer fiber woven or twisted in the design. Several of these materials are porous and susceptible to abrasion. Metallic elements are heavy due to their higher elemental density. Polymer fiber systems are lighter in weight, but are more bulky than their metal counterparts. Conventional woven sheaths are configured to provide abrasion resistance, although the sheaths are not configured as high strength members for carrying high structural tensile loads. Accordingly, there is a need for cables, sheaths and straps that overcome these disadvantages.

SUMMARY

Embodiments of the present technology are directed to flexible, elastically stretchable high strength composite fiber material that can be used to form items, such as straps, sheaths, cables, or other components.

A composite fiber material is provided that is axially flexible and has a high strength, which achieves the high strength that metal can provide, that is lightweight like polymer fiber systems. The flexible composite fiber material can be used to form objects such as straps, sheets, sheaths, and cables. The composite design of the material minimizes weight and bulkiness, which provides an advantage over the conventional systems described above. More particularly, the material can be configured with selected components so as to control the material's elongation properties, wherein elongation begins in the 0 degree direction and is limited to the fiber elongation at the point when fibers in the material break. Also, the material can achieve the highest elongation in the direction of the highest fiber angle achieved from the force axis, for example 45 degrees in a 0/90 degree weave fabric. Also, an elastic matrix material having a low modulus of elasticity (i.e., Young's modulus) is provided in the composite material in a configuration that encapsulates the fibers and allows the elastic matrix to control the elongation, modulus, and fiber rotation during pulling to cause a rapid increase in the material's stress and modulus over the range of elongation based on control of fiber orientation within the material.

In one embodiment, a flexible fiber-based composite material is provided that includes a low modulus material can be selected and configured to provide an in-plane controllable modulus, strength, and elongation. In a further embodiment, a fiber-based composite material is provided that, through control of fiber orientation, allows control of the material's response rate and the material properties to achieve a specific load, elongation, or modulus of the composite material. In a still further embodiment, fiber-based composite materials configured as tubes (i.e., sheaths) and fiber bundles are provided that include a low modulus material encasing high strength fibers configurable to provide an in-plane controllable modulus, strength, elongation, and flexibility by bonding non-bonding, or gel filled inner cores of the tubes. In a still further embodiment, a fiber-based composite material with elements of zonal controlled elongation down the length of the material is provided. In a still further embodiment, the fiber-based composite materials described in the above embodiments that include fibers or fiber bundles encapsulated by a low modulus material can serve as a core element for other substances that can be sleeved over the composite material is provided.

An embodiment of the present technology provides a fiber-reinforced composite material axially stretchable between retracted and extended positions. The material comprises an elastically deformable matrix having a first modulus of elasticity, and a fiber-based core encapsulated in the matrix. The core comprises fabric having a side edge and a longitudinal axis substantially parallel to the side edge. The fabric has first fibers interlaced with second fibers, the first fibers being in a non-parallel orientation relative to the longitudinal axis, and the second fibers being in a non-parallel orientation relative to the first fibers when the material is in the retracted position. The first fibers have a second modulus of elasticity greater than the first modulus of elasticity and exceeding approximately 2 Mpsi. The composite material stretches and moves away from the retracted position toward the extended positions upon application of an axial load substantially parallel to the longitudinal axis. The composite material has a non-linear stress curve relative to elongation of the material between the retraced and extended positions, and movement of the composite material toward the extended position causes the first and second fibers to rotate relative to each other and in a direction toward alignment with the longitudinal axis. The matrix material biases the material toward the retracted position.

Another embodiment of the present technology provides a fiber-reinforced composite material, comprising an elastically deformable matrix having a first modulus of elasticity, and a fabric core encapsulated by the matrix. The fabric core has a longitudinal axis and comprising first fibers interlaced with second fibers, wherein the first fibers being in a non-parallel orientation relative to the longitudinal axis, and the second fibers being in a non-parallel orientation relative to the first fibers when the composite material is in a retracted position. The composite material is stretchable between the retracted position and an extended position. The first fibers have a second modulus of elasticity greater than the first modulus of elasticity. The composite material stretches and moves away from the retracted position toward the extended positions upon application of an axial load substantially parallel to the longitudinal axis, wherein the composite material has a non-linear modulus related to elongation of the composite material between the retraced and extended positions. Movement of the material toward the extended position causes the first and second fibers to rotate relative to each other and in a direction toward alignment with the longitudinal axis. The matrix material biases the composite material toward the retracted position.

Another embodiment provides an axially stretchable, fiber-reinforced composite material stretchable between retracted and extended positions. The composite material has an elastically deformable matrix made of an elastomer-based material having a first modulus of elasticity in the range of approximately 10 psi-5000 psi. The composite material has planar fabric core with a side edge and a longitudinal axis substantially parallel to the side edge. The fabric core comprises first fibers interlaced with second fibers in a selected weave pattern, the first and second fibers being impregnated and encapsulated within the matrix. The first fibers are in a non-parallel orientation relative to the longitudinal axis, and the second fibers are in a non-parallel orientation relative to the first fibers when the material is in the retracted position. The first and second fibers have a second modulus of elasticity exceeding approximately 2 Mpsi. The composite material stretches axially toward the extended position upon application of an axial load substantially parallel to the longitudinal axis, wherein the material has a non-linear modulus related to elongation of the material between the retraced and extended positions, and movement of the material toward the extended position causes the first and second fibers to rotate relative to each other and in a direction toward alignment with the longitudinal axis. The matrix material biases the composite material toward the retracted position.

Still other embodiments of the present invention will become readily apparent to those skilled in the art from the following detailed description. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

BRIEF DESCRIPTION OF THE DRAWINGS

The composite fiber assemblies introduced here may be better understood by referring to the following Detailed Description in conjunction with the accompanying drawings in which like reference numerals indicate identical or functionally similar elements.

The headings provided herein are for convenience only and do not necessarily affect the scope of the embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to limit the embodiments described. On the contrary, the embodiments are intended to cover all modifications, equivalents, and alternatives falling within the scope of the embodiments as defined by the appended claims.

DETAILED DESCRIPTION

Various examples of the devices introduced above will now be described in further detail. The following description provides specific details for a thorough understanding and enabling description of these examples. One skilled in the relevant art will understand, however, that the techniques and technology discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

Fibrous composite material strengths and stiffness are highly dependent on the fiber properties, fiber orientation, and their matrix. Conventional fiber-based composite material are disclosed is U.S. Patent Application Publication No. 2015-0174885, which is incorporated herein in its entirety by reference thereto. Unlike conventional fiber-based composite materials, the flexible composite material in accordance with one or more embodiments of the present technology as described below combines specific material properties and fiber orientation to provide flexible, axially elastic, high strength materials that can be used in the formation of, for example, new strapping, sheathing, and cabling systems, as well as other systems, assemblies, or configurations. The flexible composite material is created by combining a matrix of low modulus polymers with high strength and modulus fibers or fiber bundles that results in a stretchable composite material having a non-linear modulus (i.e., the relationship between material elongation as a function of applied a load, or the stress/strain ratio of the material during axial loading).

The flexible composite material of the present technology can be used to form cables, straps, and sheets, with cables having a cylindrical shape and straps and sheets have flat shapes respectively. The flexible composite material can be used to form sheaths with cross-sections ranging from circular to substantially linear (i.e., flat). The flexible composite material can be used to form other elastically extendable, high strength, fiber-based single or multilayer components. Objects of other shapes can also be formed from the flexible composite material of the present technology.

Figure 1:
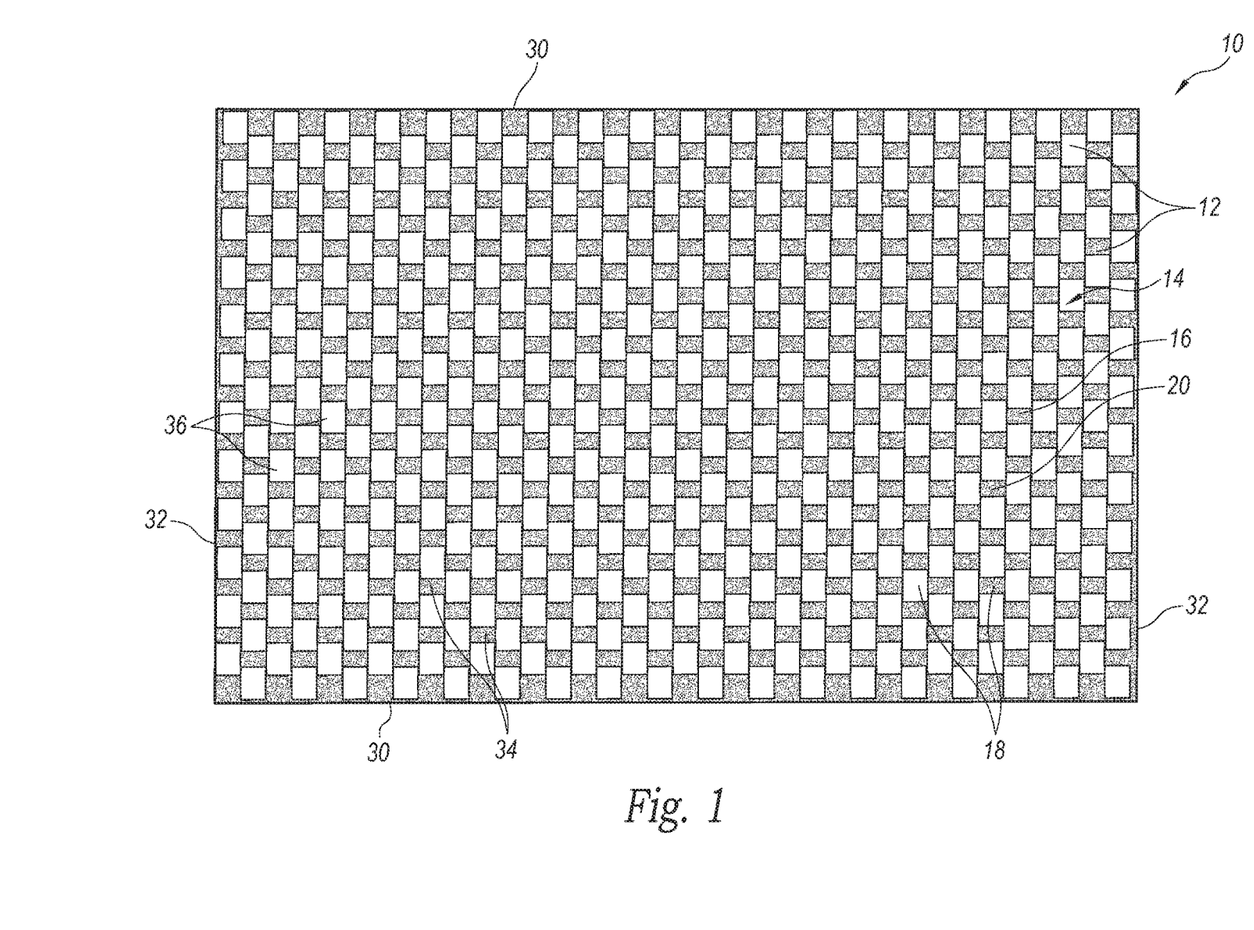
FIG. 1 is a plan view of a sheet of elastically stretchable fiber-based composite material in accordance with an embodiment of the present technology.

In one embodiment shown in FIG. 1, the flexible composite material 10 is an axially elastic, fiber-based composite fiber material, which may be referred to herein as the composite fiber material. The material 10 is made up with a single or multiple layers of high strength, high Young's modulus (i.e., high modulus) fibers 12 configured to define a fibrous fabric 14 forming the core 16 of the composite material 10. The fabric 14 can include single or multiple layers of fibers 12, and the core 16 can include a single or multiple layers of fabric 14. The fabric core 16 of some embodiments can include multiple layers of fabric 14 arranged in a common angular orientation or in selected misaligned angular orientations relative to each other. The fabric core 16 is impregnated with a low Young's modulus (i.e., low modulus) material forming an elastomeric matrix 20, such that the fibers 12 of the fabric 14 are fully encapsulated and bound together by the elastomeric matrix 20.

In one embodiment, the fabric core 16 can be made of a carbon fiber or other high strength fiber fabric 14 woven with a selected weave pattern, such as a plain weave, twill weave (i.e., 2×2 twill, 4×4 twill, etc.), a harness satin weave, or other selected weaves with a selected tow size. The fibrous fabric core 16 of other embodiments can include other kinds of fibrous fabrics, such as fabrics made of organic fibers, such as polymers, Kevlar, nylon, and/or fabrics made of inorganic fibers, such as glass, metal fibers (i.e., aluminum fibers), nano fibers, nanotube fibers, and ceramic fibers (i.e., alumina fibers, silicon carbide, etc.). The core 16 can be made of fibers 12 having a high modulus of elasticity exceeding approximately 2 Mpsi and in the range of approximately 2-85 Mpsi, and preferably in the range of approximately 15-30 Mpsi.

The low modulus material forming the matrix 20 can be an elastomer-based material in the thermoplastic or thermoset families, such as thermoplastic polyurethanes, styrene butadiene styrene block copolymers (SBS), styrene-ethylene/butylene-styrene (SEBS), styrene-ethylene/propylene-styrene (SEPS), thermoplastic polyolefins (TPO), polyurethanes, silicones, and various other rubber materials, such as ethylene-propylene rubber, nitrile, and butyl. Still other types of the low modulus materials can be used as the matrix 20 that encapsulates and/or impregnates the fiber-based core 16. The matrix material's modulus can be in the range of approximately 10 psi to 5000 psi, and preferably between approximately 100 to 500 psi, though other types of material with a different low modulus can also be used in a further embodiment.

The matrix 20 can be made of a single low modulus material. In other embodiments, the matrix 20 can be made of two or more materials combined in a mixture or joined in a layered configuration before or during application to the fiber core 16, with the matrix 20 bonding together the fibers 12 and fibers bundles of the fabric core 16 and encapsulating the fibers 12. The matrix 20 can be applied to the fabric core 16 through a variety of techniques, such as spray coating, draw coating, dip coating, roll coating, etc. Other methods that allow to control the quantity of material in the matrix 20 and push the matrix material into and around the fibers 12 can also be used. For example, for thermoplastics, such other methods can include belt lamination, extrusion lamination, extrusion calendaring, and film bonding with a reactive polymer adhesive to the thermoplastic film. Still other methods to apply the low modulus elastomeric matrix 20 to the fabric core 16 are possible.

Figure 10A:
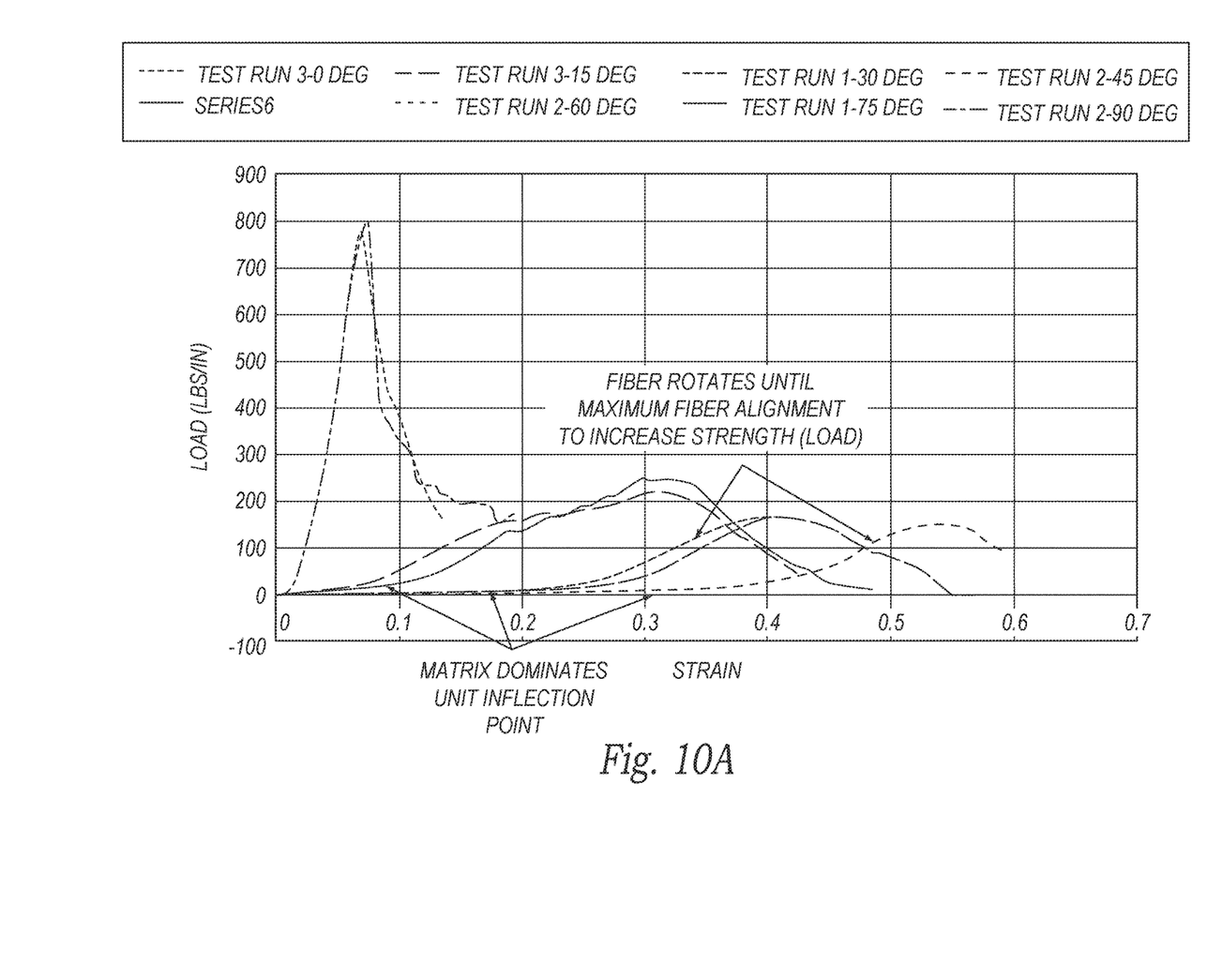
FIGS. 10A and 10B show material strain stress plots of materials of embodiments of the present technology wherein the materials have a 0° shift (FIG. 10A) and an 8° shift (FIG. 10B).
Figure 10B:
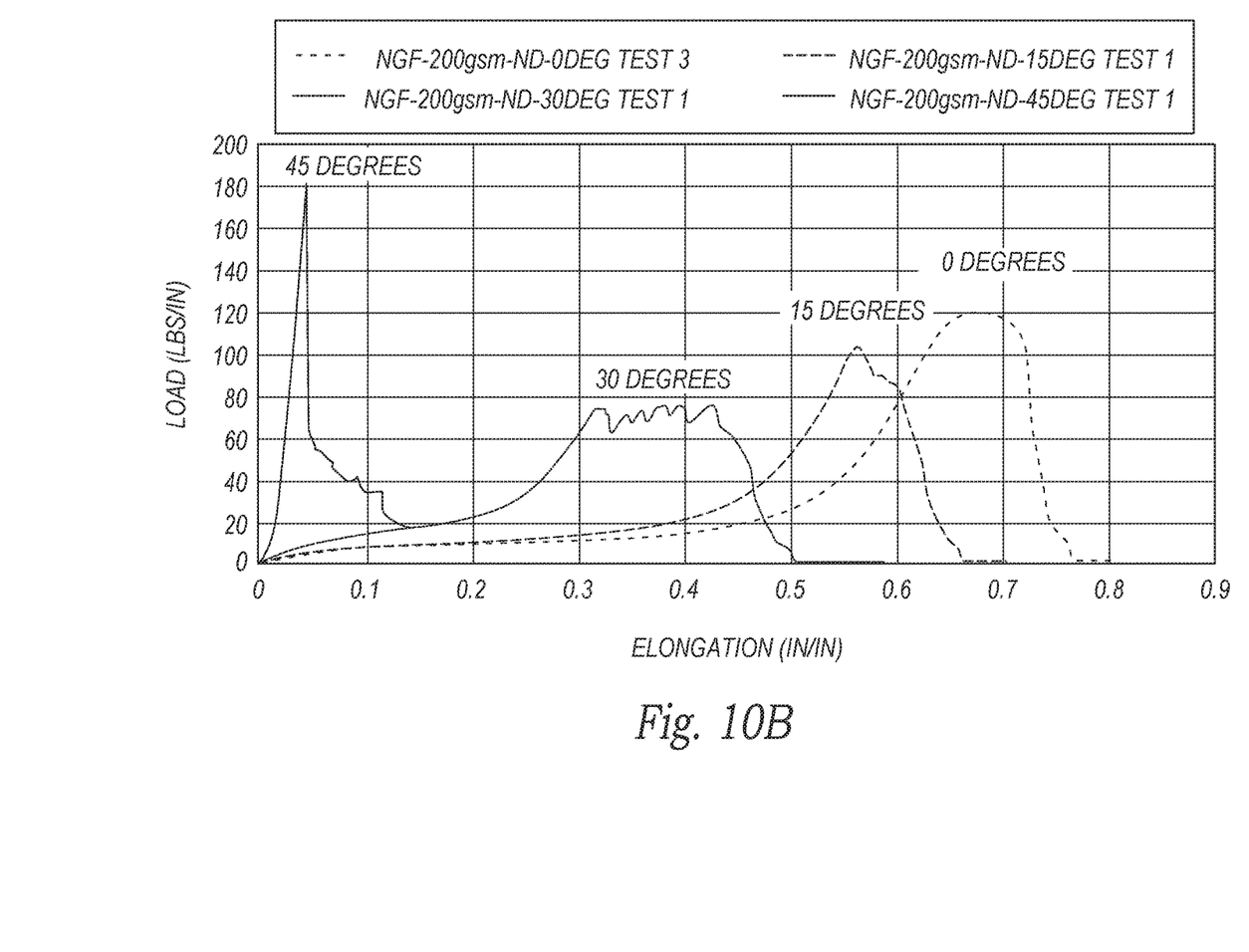

The modulus of elasticity, elastomeric deformation, and elongation of the matrix 20 plays a role in the properties of the fiber rotation (i.e., angular movement of the fibers in response to an axial, in-plane load applied to the material 10), as seen in the stress strain plots shown with reference to FIGS. 10A and 10B below. The elastomeric matrix component of the material 10 elongates under the loading condition, and the high modulus fibers 12 rotate toward the direction of the axial, in-plane load applied to the material 10. The fiber orientation relative to the edge of the sample material 10 being called the "fiber angle." As the material 10 is axially stretched and fiber rotation reaches the limit wherein the fibers 12 are blocked from further rotation toward an orientation parallel with the axial direction of the load and/or the longitudinal axis of the material 10, the fibers 12 carry (i.e., react) the applied axial load. The stretchable composite material 10 is configured with the selected matrix 20 encapsulating the selected fabric core 16 such that the composite material 10 has a non-linear modulus corresponding the stress/strain ratio of the material during axial loading. The non-linear modulus also corresponds to the slope of the non-linear curve for each material sample illustrated in FIGS. 10A and 10B, which is the stress/strain ratio as a function of material extension. Accordingly, the modulus of the stretchable composite material 10 changes as a function of elongation upon application of the load, wherein the modulus is relatively low when the material is about at the retracted position (i.e., a substantially relaxed condition), and the modulus increases as the material stretches through a selected intended usable elongation range for the material. The material's modulus is greater still as the material approaches and reaches a fully extended position. When fiber rotation approaches or reaches the limit as the material approaches the fully extended position, the additional axial elongation of the stretched material is minimized to the stretch of the fibers 12, until maximum load is reached, after which structural failure of the material 10 will occur when the axial load exceeds the tensile strength of the fibers 12 of the material's core 16.

The fabric 14 forming the core 16 in an embodiment can be made of a plurality fiber bundles that form the tows 18 woven together or otherwise oriented in the fabric 14. The fiber bundles can be formed by a plurality of straight, parallel fibers interconnected by a selected binder. Alternatively, the fiber bundles can be formed by a plurality of fibers twisted together in a spiral or helical configuration relative to the bundle's longitudinal axis, with a selected number of twists in the bundle about the bundle's longitudinal axis. For example, the fiber bundle can have from 0 to approximately 20 twists per 18 inches of bundle length. When the twisted fiber bundles are encapsulated within the matrix 20, the twisted fiber bundles can be used to help control the elastic stretch of the fabric. When an in-plane axial load is applied to the fabric and the fiber bundles move toward or are in approximate alignment with the load, the fiber bundles can elastically elongate by untwisting the fibers within the bundle about the longitudinal axis. The greater the load, the more the fibers will be pulled axially causing fiber bundles to untwist and elongate. The greater the number of twists in the fiber bundle, the greater the extent of elongation of each fiber bundle relative to its longitudinal axis under the in-plane axial load. Conversely, minimum fiber bundle elongation happens when the fiber bundle has no twist and the fibers are substantially parallel to the longitudinal axis and/or the applied axial load.

The amount of potential elongation of the fiber bundle under load can be increased by adding twists to the fiber bundle before formation of the fabric 14 and/or encapsulation within the matrix 20. The fiber bundles can be processed with the low modulus encapsulating material via techniques such as using a resin bath coater or a hot melt extrusion impregnation process. Accordingly, the extent of available fiber bundle elongation can be controlled by the low modulus encapsulate and by the number of twists in the fiber bundle. The low modulus elastomeric encapsulate also provides the biasing return mechanism for the fiber bundles to the re-twist and return to the original un-stretched length after the load is removed, thereby creating a rubber band effect that allows the fiber bundles to elongate and retract between a retracted position and fully stretched position, with a hard stop to elongation occurring substantially at the fully stretched position. The stretched elastomeric matrix 20 provides the stored energy to return the fiber bundles back to the retracted position and their original length when the axial load is removed from the material 10.

In at least one embodiment, the twisted or untwisted fibers or fiber bundles are woven together with a selected weave pattern to form the substantially planar fabric 14 forming the core 16, which is then encapsulated with in the elastomeric, low modulus matrix 20 to form a sheet of the material 10. As discussed in greater detail below, once the fabric core 16 is encapsulated with the low modulus matrix 20, the encapsulated fabric can then be cut into selected components, such as the elongated strips for use as elastically extendable straps or other components. As shown in FIG. 1, before the sheet of woven material 10 is cut, the sheet has opposing parallel side edges 30 extending between opposing end edges 32. The encapsulated fabric 14 has a first plurality of warp fibers 34 oriented parallel to the side edges 30 and a second plurality of weft fibers 36 oriented parallel to the end edges 32. The relative angular orientation between the warp and weft fibers 34 and 36 is a perpendicular orientation, when the fiber-based fabric 14 is at a 0 degree offset. In this configuration, the side edges 30 are substantially perpendicular to the end edges 32. Accordingly, the angular orientation of the warp and weft fibers 34 and 36 are perpendicular to each other, and at 0 degree and 90 degree, respectively, relative to the side edge 30. The sheet of encapsulated fabric 14 can be cut, such as into elongated strips to form elongated axially stretchable straps or other stretchable, high strength components. The cuts to the sheet can be at an acute or obtuse angle relative to the side edge, which will result in a component with a greater range of elongation. Alternatively, the cuts to the sheet can be parallel and perpendicular to the side edge 30 such that the angular orientation of the warp and weft fibers 34 and 36 are at 0 and 90 degrees relative to the side cut edge (i.e., parallel to the strap's longitudinal axis and an axial tension load applied to the strap). The fiber orientation in the fabric 14 of the strap can be advantageous by leaving the fibers in the 0 and 90 degree angles in the loading direction parallel to the side edge 30, which minimizes elongation to the fiber limits, and maximizes the flexible composite material strength and stiffness as illustrated below with reference to FIG. 3.

Figure 2:
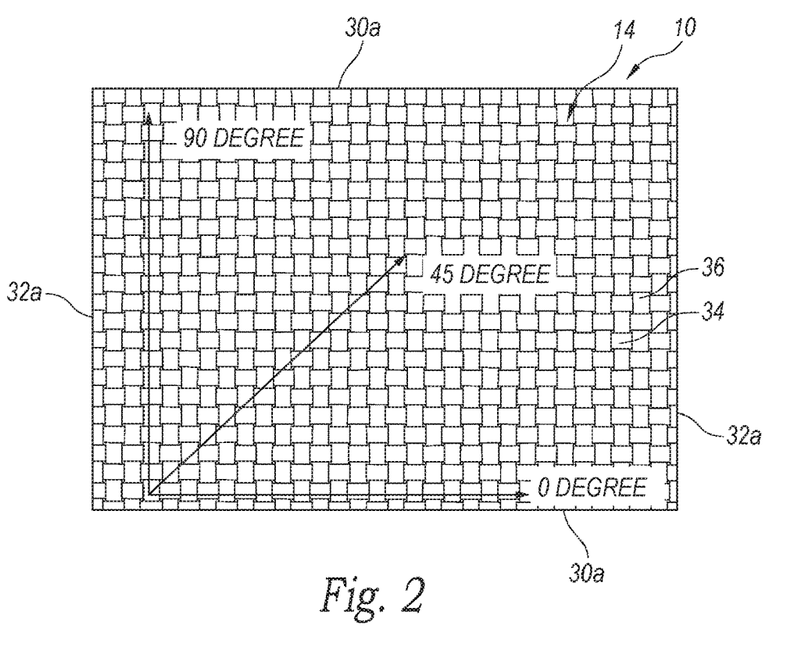
FIG. 2 is a partial plan view of an elastically stretchable fiber-based composite material in accordance with an embodiment of the present technology, wherein the illustrated material has a 2×2 twill weave with the weave pattern at right angles, i.e., 0/90 degrees.

The fabric 14 illustrated in FIG. 2 is a 2×2 twill weave, with the weave pattern at right angles (0/90 degrees). The 0/90 angles refer to the orientation of the fibers relative to the side edge 30 of the uncut material or side cut edge 30*a* of the material. The 45 degree angle as illustrated would be halfway between the 0/90 pattern. As forces are exerted on the material in the 0 degree direction (i.e., parallel to the warp fibers 34) or the 90 degree direction (i.e., parallel to the weft fibers 36) and in the plane of the fabric 14, the maximum initial strength and stiffness of the composite material 10 are achieved, and the minimal stretch or elongation of the material 10 will result. For any loads exerted on the fabric 14 in the 45 degree direction and in the plane of the fabric 14, the material will be at lowest initial strength and stiffness and also will result with the highest level of elongation in the direction of the applied load. The load applied in the 45 degree direction will cause the low modulus matrix 20 to elastically stretch as the plurality of fibers 12 rotate toward a parallel alignment with the axial load. The extent to which the low modulus matrix 20 stretches and the fibers 12 rotate depends upon the material characteristics and the force of the load applied to the material 10. The greater the load, the more the matrix 20 will stretch and the fibers 12 will rotate away from the 0/90 degree orientation relative to the side edge 30.

Figure 3:
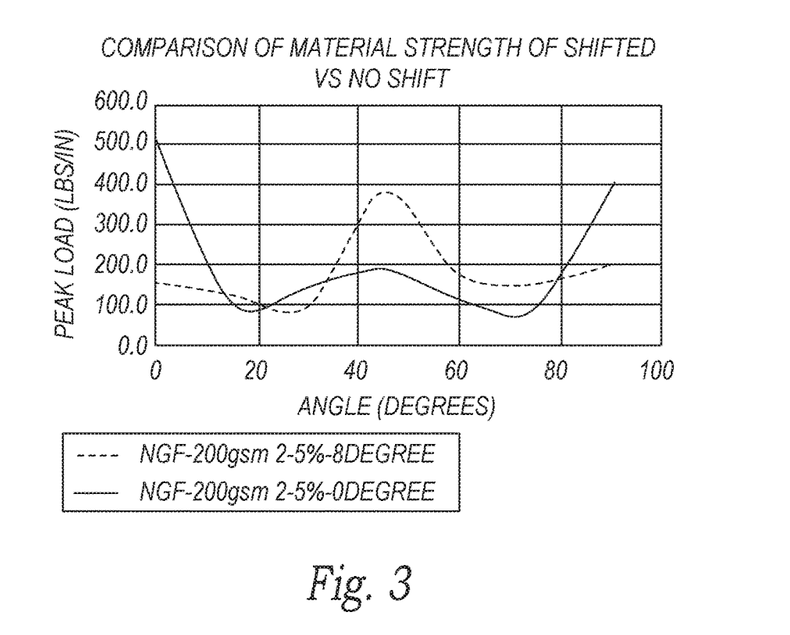
FIG. 3 is a graph illustrating material strength relative to an angle in the in-plane force applied to the material of FIGS. 2 and 4.

Shifting of the fabric 14 serving as the core 16 before encapsulation with the low modulus matrix 20 can alter the properties of the flexible composite material 10. FIG. 3 is a graph illustrating material strength relative to an angle in the in-plane force that is applied to the material 10 (i.e., co-planar with the sheet of material 10). The graph illustrates data for the in-plane peak loads applied at angles from 0 degrees to 90 degrees relative to a side edge 30 (or cut side edge 30*a*) for a sheet of material 10 with no shift (i.e., 0 degree shift), and a sheet of material 10 with an 8 degree shift (i.e., the angle between the end edge 32 or/and cut edge 32*a* (FIG. 2), and a line normal to the side edge 30 or cut side edge 30*a*). Accordingly, this data illustrates the design flexibility in levels of shift for different material behavior to in-plane loads applied to the material 10.

Figure 4:
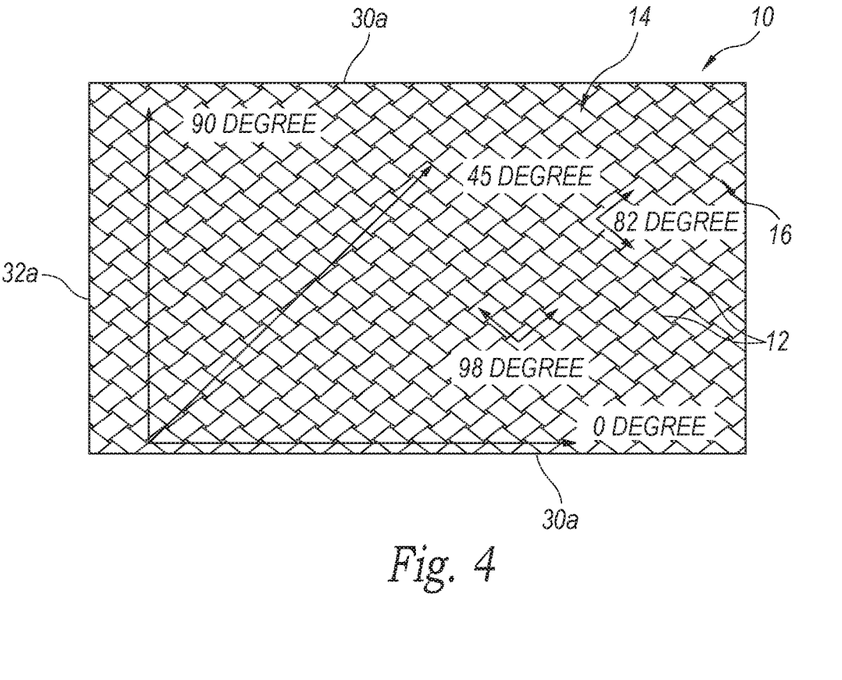
FIG. 4 is an illustration of an embodiment of the material of FIG. 2 with a fabric having a 2×2 twill weave fabric that has been shifted 8 degrees.

FIG. 4 is an illustration of an example of a 2×2 twill weave fabric 14 that has been shifted 8 degrees. The angle between the warp and weft fibers 34 and 36, respectively, of the weave pattern is now at 82 and 98 degree angles, with the angles being the angles of the two intersecting fiber tows (bundles) either acute or obtuse in angle. This sheet of material 10 with the 8 degree shifted fabric 14 can then be cut to form an elongated strap or other component, with the cut at an angle so the cut side edge 30*a* is normal to the angle of shift. The cut material 10 was tested by applying in-plane loads through 0/90 degrees relative to the side cut edge 30*a* of the fabric and not relative to the fiber orientation. In other words, the in-plane loads are applied in a direction from parallel to the side cut edge 30*a* through a direction perpendicular to the side cut edge 30*a*, which may be parallel to the end cut edge 32*a* if the end cut edge 32*a* is perpendicular to the side cut edge 30*a*. The maximum strength and stiffness are not attained at 0 and 90 degrees, but now peak at approximately 37 or 53 degrees and the highest elongation is at 8 degrees. While the illustrated embodiment shows a sample wherein the fabric of the material is shifted 8 degrees, other embodiments can include a material with a fabric that is shifted to other angles greater or less than 8 degrees.

The fabric 14 can be shifted prior to being combined with and encapsulated in the low modulus matrix 20 to create the flexible fiber-based composite material 10. The following example of a material 10 with a fabric having an 8 degree shift is provided only for the purposes of illustration and other ways to achieve the shift are possible. A 50 inch long and 36 inches wide sheet of fabric 14 is taken, and the fabric sheet is shifted a necessary distance to achieve a desired shift pattern. For example, the fabric sheet can be shifted to move one side edge laterally relative to the opposing side edge by about 5.25 inches, to achieve the 8 degree shift described above. In a roll-to-roll processing, the sheet of fabric 14 would come off the roll and across a roller that is shifted to the desired shift pattern angle, which would keep one side edge of a 50 inch wide roll in a fixed position and an opposite parallel side edge of the roll would move laterally the desired number of inches (5.25 inches in the 8 degree shift example) to the targeted shift angle. Once the shift angle is achieved, the fabric 14 is combined with the low modulus material of the matrix 20 to create the flexible composite material 10.

Figure 11A:
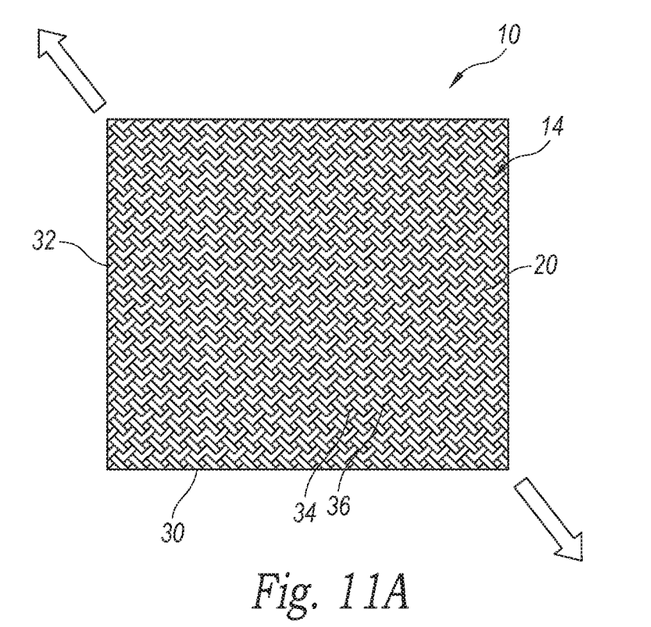
FIGS. 11A-D are diagrams showing examples of unshifted and shifted fabrics of materials in accordance with embodiments of the present technology.
Figure 11B:
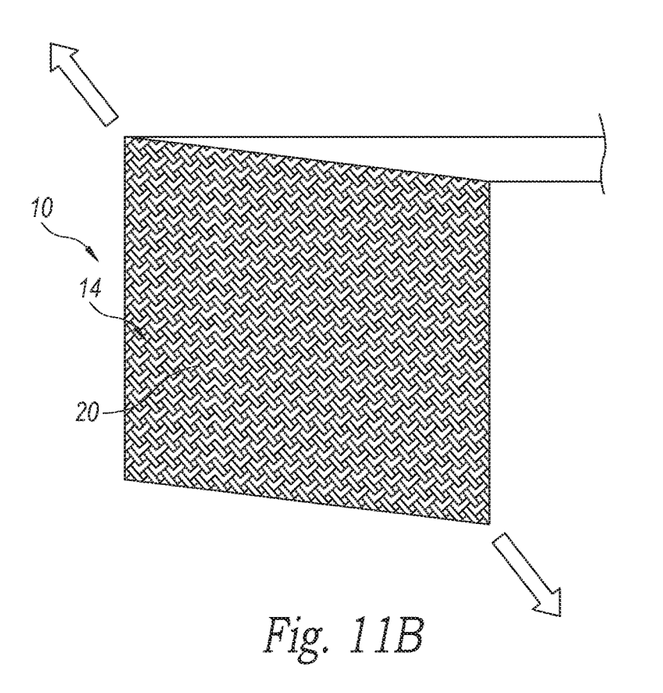
Figure 11C:
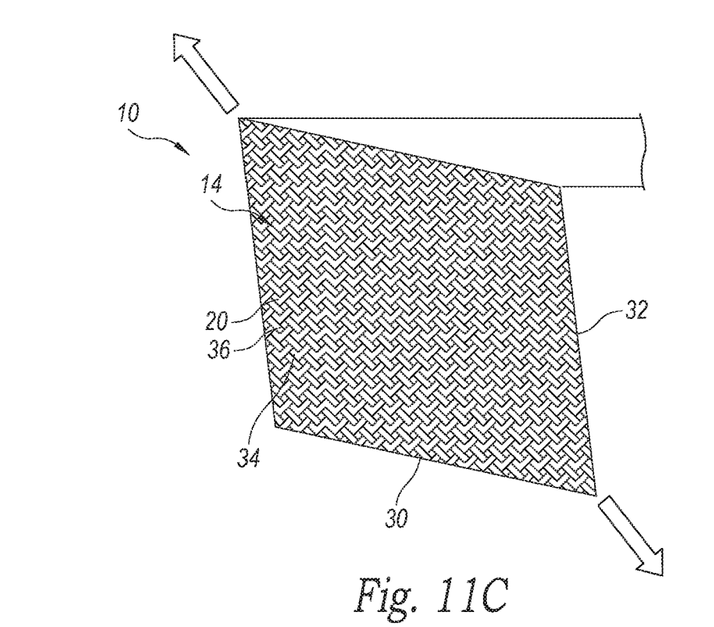
Figure 11D:
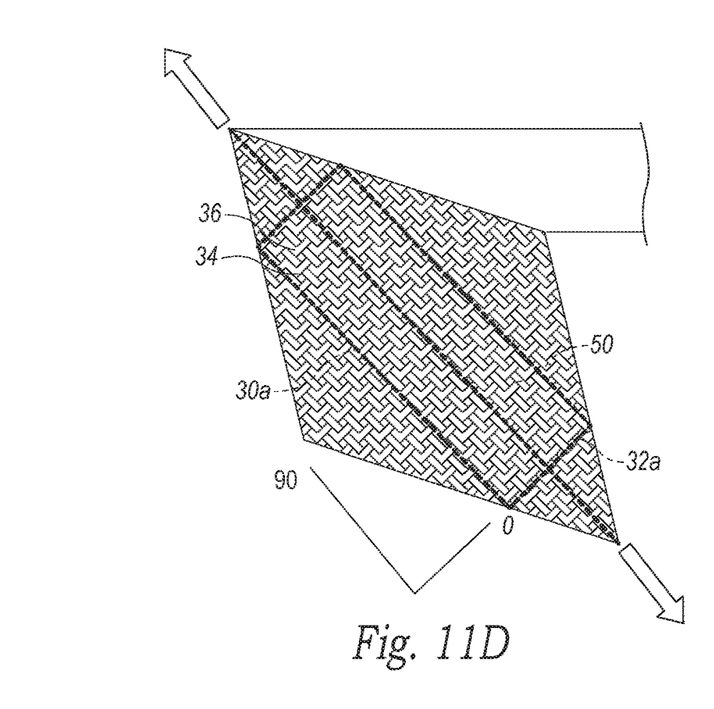

A further illustration of a method for creation of the shifted fabric 14 for use in a sheet of material 10 is seen in FIGS. 11A-D. FIGS. 11A-D are diagrams showing examples of unshifted and shifted fabrics 14. The fabric 14 with no shift is shown in FIG. 11A, and subsequent fabrics 14 are shown in FIGS. 11B through 11D, with the degree of the shifts increasing from FIGS. 11B through 11D. Once the amount of lateral shift for the fabric 14 has been achieved, the fabric is impregnated with and/or encapsulated within the matrix 20. Elongated straps, strips, or other segments of the material can be cut out or otherwise removed of the sheet of shifted material 10. For example, FIG. 11D illustrates one example of removing a section of the shifted fabric relative to the two longest end-points, where the sides and ends of the cut-out section are parallel and perpendicular relative to each other, respectively. The warp and weft fibers 34 and 36 in the fabric 14, however, are not parallel and perpendicular to each other. For example, a strap 50 cut from a sheet of the stretchable, fiber-based composite material 10 with fabric having an 8 degree shift will have warp and weft fibers 34 and 36 oriented at 82° and 98° relative to each other. The new illustrated references for 0 and 90 degree orientations within the cutout section (i.e., a strap) are now with respect to the side cut edges 30*a* as shown in FIG. 11D.

In one embodiment, elongated, axially stretchable planar straps 50 are made of the elastomeric, fiber-based composite material by cutting the straps 50 from one or more sheets of the flexible composite material 10. The straps 50 can be cut at various angles relative to the side edge 30 of the sheet of material, creating straps (or other cut-out elements) with differing properties, such as strength, stiffness, and degree of elongation, depending upon the components of the composite material 10. For example, elongated straps 50 can be cut from a sheet of material 10 having a 0 degree shift (i.e., a 0/90 weave pattern), wherein the material 10 is cut so the strap's side cut edge 30*a* is anywhere between 0 degrees (parallel) relative to the material's side edge 30 to 90 degrees (perpendicular) to the material's side edge 30. The angle at which the strap 50 is cut from the sheet of material 10 will determine, in part, the strap's strength, stiffness, and degree of elongation. Accordingly, alternative fiber angles in the strap 50 relative to the cut side edge 30*a* can be achieved by cutting the strips of the flexible composite material at angles between 0 and 90 degrees to provide cut strips having novel elongation characteristics and rapid responses to loading the strap and locking in the elongation and significantly increase the strength. This is caused by the fiber rotation approaching or reaching the lock-out angle that stops the fibers from rotating and loading the fibers in their highest degree of fiber angle to the load.

Figure 5:
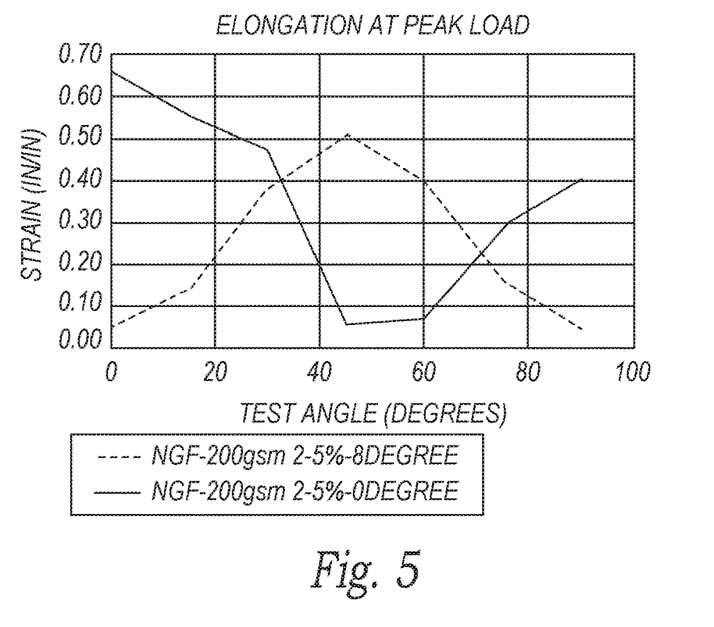
FIG. 5 is a graph illustrating an elongation behavior of the material of FIGS. 2 and 4 at peak load achieved with no shift and an 8 degree shift.

The fabric 14 in the sheet of flexible composite material 10 can also be shifted to produce acute or obtuse fiber angles relative to an axial loading direction parallel to the material's side cut edge 30*a* as shown with reference to FIG. 4. Strips can be cut from the material 10 with the fabric 14 shifted to a selected angle, wherein the strips can be cut so the side cut edge 30*a* is at an angle anywhere from 0 degrees to 90 degrees relative to the materials side edge 30. The strips can be used as elastically stretchable, high-strength straps 50. A highly shifted fabric 14 in the flexible composite material 10 and/or a strap cut therefrom with an obtuse angle exceeding 120 degrees will provide high elongation until the elongation rotates the shifted fabric toward the direction of the axial load enough so the fibers move toward alignment with the axial load until the rotated weave structure locks the warp and weft fibers 34 and 36 against each other and substantially preventing or resisting further rotation thereby providing a rapid increase in stress, a decrease in elongation, and a different response as compared to the responses shown in the graphs of FIGS. 3 and 5. FIG. 5 is an illustration of an elongation behavior at peak load achieved with no shift an 8 degree shifted fabric.

The alternative cutting angles are described relative to the edge of the flexible composite material 10. For example, a fabric 14 with no shift has fiber angles of 0 and 90 degrees, and the sheet or roll has a straight edge that is then cut to angles relative to the constant straight edge of the sheet or roll. The second approach is where the fabric is shifted 10 degrees or other selected shift angle, and there is a straight side edge 30 from the sheet or roll of material and the strips are cut at angles from that material relative to the constant straight side edge 30.

Figure 6:
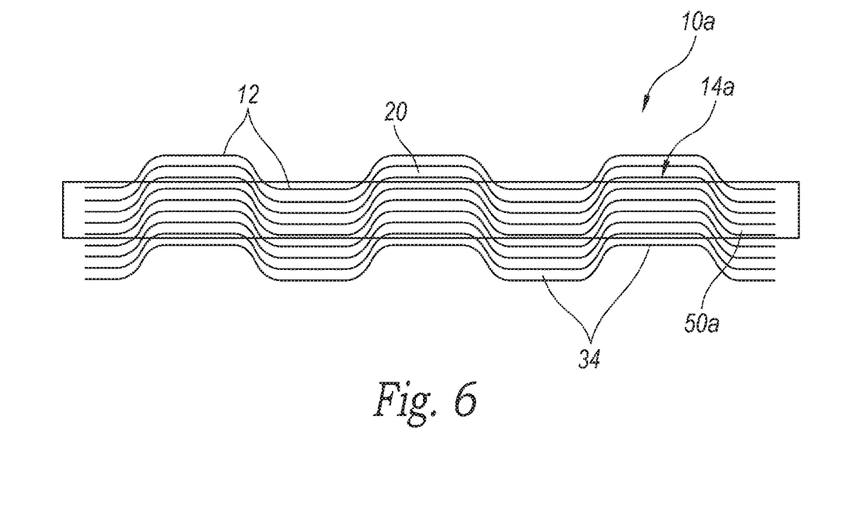
FIG. 6 is a schematic view of a sheet of fiber-based composite material in accordance with an embodiment of the present technology, wherein the material has a configuration with lateral shifting fabric weaves in regular or irregular repeating shifts.
Figure 7:
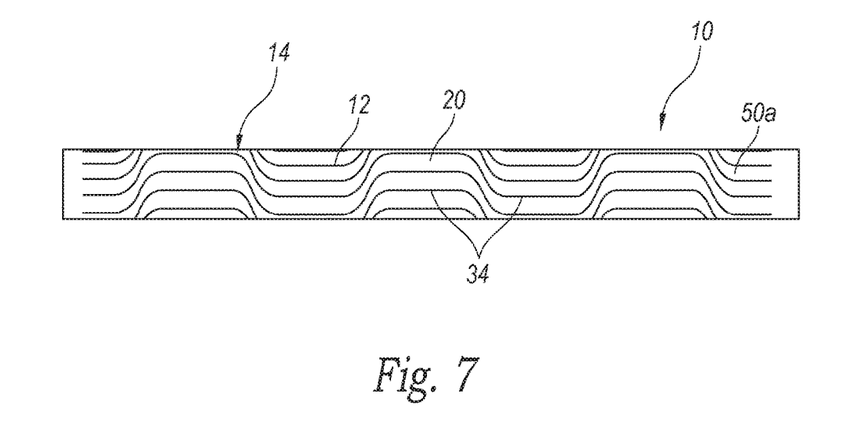
FIG. 7 shows an example of a strip of material cut from the sheet of material of FIG. 6 illustrating the lateral shifted material usable as a strap.

In the above examples, the fibers 12 in encapsulated fabric 14*a* are shifted angularly by a selected amount. In another embodiment, the flexible composite material 10 can be used to form a strap or other component with spatial controlled elements along its length of other selected dimensions of the strap. FIG. 6 illustrates a sheet of material 10*a* wherein the fibers 12 in the fabric 14 have been shifted generally laterally to specific offsets in a repeated pattern. For example, the sections of the warp fibers 34 along the lengths of the fibers can be laterally off set, such that selected sections step up away from the material side edge. The fibers can also step down toward the materials side edge, or the fibers can selectively be stepped up in some portions of the material and stepped down in other portions of the material, including an alternating step up/step down arrangement in a selected pattern. The lateral offset pattern in the fabric 14*a* and/or resulting strap does not have to be repeatable, nor does it need to be uniform. Accordingly, the matrix-encapsulated fabric 14*a* can be configured with a shifted pattern to provide selected elongation control in specific locations in the material or strap based on the shift of the material. In another embodiment, the material 10*a* can include a high modulus fabric 14*a* encapsulated in the elastomeric matrix 20, wherein the fibers 12 in the fabric 14*a* are shifted both angularly and laterally. The shifted material 10*a* is then cut into straps 50*a*, as shown with reference to FIG. 7, or preferred shapes that has zonal stretch control based on the design. FIG. 7 shows an example of a strip of material 10*a* that would be cut from the design shown with reference to FIG. 6 to illustrate how the shifted material would be used in a strap system.

Figure 8:
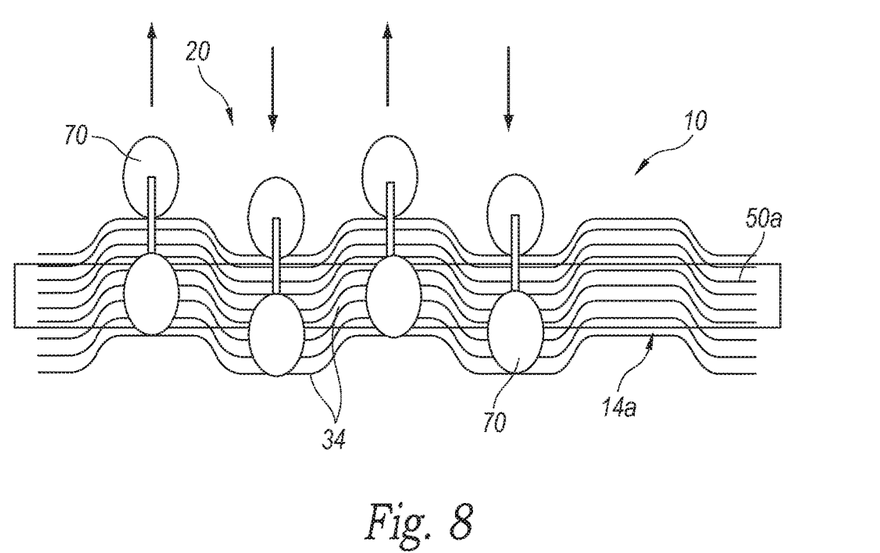
FIG. 8 is an illustration of a method for creating the design shown with reference to FIG. 6 in accordance with one embodiment.

To create the strap 50*a* shown with reference to FIG. 6 the fibers 12 could be shifted based on a particular repeating period that would achieve a straight section of no shift and the material 10 would be pulled from one edge to the offset distance for a desired length and then pulled back into the same alignment as the section prior to shifting. FIG. 8 is a diagram illustrating a method for creating the design shown with reference to FIG. 6 in accordance with one embodiment. The shifting can be accomplished by steering the fabric on the fabric's edges with rollers 70 or shifting wheels against a belt so as to releasably engage selected portions of the fibers 12 and pull or push the fibers 12 in-plane laterally a selected distance relative to the material's side edge to achieve the desired lateral fiber offset.

Figure 9:
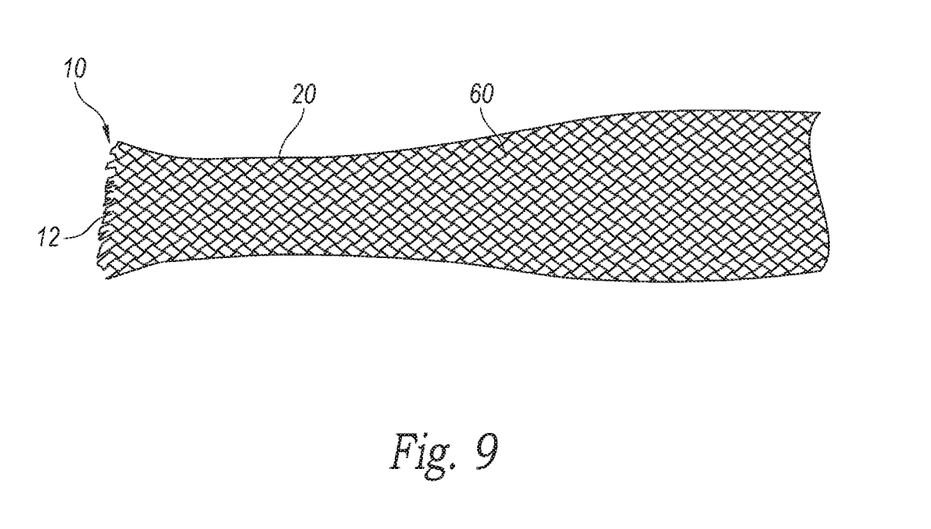
FIG. 9 is an image showing a carbon fiber biaxial braided tube in accordance with embodiments of the present technology.

The flexible composite material according to a further embodiment can also be a part of tubes 60, such as elastically extendible, high strength fiber reinforced composite sheaths (i.e., sleeves), wherein high modulus fibers 12 are interlaced, such as by braided, into a specific fiber orientation and impregnated with the low modulus matrix 20. FIG. 9 is an image showing a carbon fiber biaxial braided tube 60. The tube 60 in its designed diameter is one inch with fiber angles of +/−45 degrees. The tube diameter can be reduced or increased by shifting the fiber angles off of the neutral axis from the tube 60. For example, to reduce the tube diameter down to ¾ inch the tube 60 would elongate in the x-axis (i.e., its longitudinal axis) and shrink in the y-axis through shifting the fiber angle towards the neutral axis, thereby causing a low fiber angle and reduced elongation and high strength. Alternatively, the tube diameter can be increased by shifting the fibers 12 to a higher angle from the neutral axis, which would result in a high elongation and a lower strength. The braided tube material can be made into a cable with controlled braid angles, with the angles controlling the amount of elongation (stretch in the cable).

The tube 60 shown with reference to FIG. 9 has a fiber orientation relative to the axis of the tube 60 ranging from 5-85 degrees. The angles are achieved by stretching the tube 60 axially and reducing the tube's diameter or by pushing the tube axially and enlarging the tube 60 as shown with reference to FIG. 9. The lowest angle will achieve the smallest diameter and lowest angle to the cylindrical axis and the highest angle by pushing the tube together to form the largest diameter. The tubular braided fiber material is also impregnated with a low modulus material from the matrix 20 to provide modulus and elongation control. The interior of the braided sleeve can be bonded, non-bonded, or filled with a viscoelastic material, such as rubber, polyurethane and silicone gels, to allow for controlled flexibility in bending. A bonded interior will yield a stiffer material in bending while a non-bonded or gel filled system will allow for internal shear between the two layers thereby providing increased flexibility. In the above embodiments, the braided tubes 60 can be used in a generally cylindrical configuration with a generally circular cross-sectional shape. In another embodiment, a braided or otherwise interlaced tube can be formed with the high modulus fibers 12 having a selected angular orientation. The tube 60 can then be flattened in a direction normal to the longitudinal axis, such that the tube 60 is generally flattened with one layer atop another, so the tube 60 has a generally linear cross-sectional shape. The flattened high modulus fiber tube is then impregnated and encapsulated in the low modulus matrix 20. This encapsulated flatten tube structure could be configured as a multi-layer, elastomeric, high-strength, fiber reinforced composite strap having a length that is not limited the length of a woven sheet of fabric.

In another embodiment, the elastic fiber-based composite material of the present technology can have a cable configuration that comprises a fiber bundle with a plurality of substantially parallel fibers arranged in a twisted, spiral or helical configuration relative to a central longitudinal axis of the cable. The high modulus fibers, such as carbon fibers or the like, are impregnated and fully encapsulated within the elastomeric, low modulus matrix. The cable is stretchable from a first, substantially retracted position to a second, substantially axially stretched position. In the retracted position, the fibers in the cable have the highest number of selected twists about the longitudinal axis. In the stretched position, the fibers in the cable un-twist and/or stretch the matrix, thereby orienting the fibers closer to a configuration parallel with the cable's longitudinal axis (and the axial load applied to the cable), such that the cable has fewer or no twists along its length, or along a portion of the cable. The elastomeric matrix encapsulating the fibers stretches to allow the rotation or un-twisting of the fibers, and the matrix provides a biasing force that urges the cable to the twisted, relaxed configuration.

Minimum fiber bundle elongation happens when the fiber bundle has no twist and the fibers are substantially parallel to the longitudinal axis and/or the axial load applied to the cable. The amount of elongation that the cable has between the retracted position and the extended position can be increased by adding twists to the fiber bundle before encapsulation within the matrix. The low modulus matrix can be applied to the fibers via coating techniques, such as using a resin bath coater or a hot melt extrusion impregnation process so as to fully encapsulate the twisted fibers.

The above described flexible composite material, as well as articles of manufacture such as cables, sheaths, and straps formed of the composite materials, and the tubular fiber system can also be combined with other elements where the flexible composite material or the tubular fiber system could be a core element covered with other substances, such as polyamide webbing or Kevlar, though other kinds of substances can also be used to cover the composite material.

In one embodiment, the straps made of the elastically stretchable, fiber reinforced composite material discussed above can be cut to a selected length and finished for use in a wide variety of applications. The straps can have finished and/or reinforced ends configured of permanent or temporary attachment to another structure. The straps or sheets of could be used in a wide variety of applications, such as in consumer goods, (e.g., apparel, footwear (straps, uppers, sole components, orthotics), etc.), as retention devices, as tensile load structural members, or any other use in lieu of conventional straps or belts. The cables and/or sheaths can also be used for any number of manners, including as replacements for conventional cables and/or sheaths. The straps, sheets, cables, and/or sheaths can also be used in medical devices and/or medical appliances (e.g., orthopedic braces, etc.). These are only a few examples of applications of the elastically stretchable, fiber reinforced composite material, although the material could be used in many other applications.

Remarks

The above description, drawings, and appendices are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments.

While aspects of the present technology have been particularly shown and described as referenced to the embodiments thereof, those skilled in the art will understand that the foregoing and other changes in form and detail may be made therein without departing from the spirit and scope of the invention.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. A fiber-reinforced composite material axially stretchable between retracted and extended positions, the material comprising:
    an elastically deformable matrix having a first modulus of elasticity; and
    a core comprising fabric having a side edge and a longitudinal axis parallel to the side edge, the fabric being encapsulated in the matrix, the fabric comprising first fibers interlaced with second fibers, the first fibers being in a non-parallel orientation relative to the longitudinal axis, and the second fibers being in a non-parallel orientation relative to the first fibers when the material is in the retracted position, wherein at least the first fibers have a second modulus of elasticity greater than the first modulus of elasticity and exceeding 2 Mpsi;
    wherein the composite material stretches and moves away from the retracted position toward the extended positions upon application of an axial load parallel to the longitudinal axis, wherein the composite material has a non-linear stress curve relative to elongation of the composite material between the retracted and extended positions, and movement of the material toward the extended position causes the first and second fibers to rotate relative to each other and in a direction toward alignment with the longitudinal axis, and the matrix material biasing the composite material toward the retracted position.

2. The material of claim 1 wherein the fabric is a planar, woven fabric.

3. The material of claim 1 wherein the first or second fibers are carbon fibers.

4. The material of claim 1 wherein the first fibers are perpendicular to the second fibers when the composite material is in the retracted position.

5. The material of claim 1 where the fabric is a woven fabric with a 2×2 twill or 4×4 twill weave pattern.

6. The material of claim 1 wherein the fabric has an angular offset configuration when the fabric is encapsulated in the matrix.

7. The material of claim 1 wherein the second fibers are oriented at an acute angle or an obtuse angle relative to the first fibers when the composite material is in the retracted position.

8. The material of claim 1 wherein the second fibers are oriented at an obtuse angle relative to the first fibers when the composite material is in the retracted position, and the second fibers are oriented at an acute angle relative to the first fibers when the composite material is in the extended position.

9. The material of claim 1 wherein the first modulus of elasticity of the matrix is in the range of approximately 10 psi to 5000 psi.

10. The material of claim 1 wherein the first modulus of elasticity of the matrix is in the range of approximately 100 psi to 500 psi.

11. The material of claim 1 wherein the second modulus of elasticity is in the range of approximately of 15 Mpsi-30 Mpsi.

12. The material of claim 1 wherein the first or second fibers in the fabric are twisted fibers impregnated with the matrix.

13. A fiber-reinforced composite material, comprising:
    an elastically deformable matrix having a first modulus of elasticity; and
    a fabric core encapsulated by the matrix, the fabric core having a longitudinal axis and comprising first fibers interlaced with second fibers, wherein the first fibers being in a non-parallel orientation relative to the longitudinal axis, and the second fibers being in a non-parallel orientation relative to the first fibers when the composite material is in a retracted position, the composite material being stretchable between the retracted position and an extended position, wherein at least the first fibers have a second modulus of elasticity greater than the first modulus of elasticity;
    wherein the composite material stretches and moves away from the retracted position toward the extended positions upon application of an axial load parallel to the longitudinal axis, wherein the material has a non-linear modulus related to elongation of the material between the retracted and extended positions, and movement of the material toward the extended position causes the first and second fibers to rotate relative to each other and in a direction toward alignment with the longitudinal axis, and the matrix material biasing the composite material toward the retracted position.

14. The material of claim 13 wherein the fabric is a woven or braided fabric.

15. The material of claim 13 wherein the fabric core is a braided tube.

16. The material of claim 13 wherein the first fibers are perpendicular to the second fibers when the composite material is in the retracted position.

17. The material of claim 13 wherein the second fibers are oriented at an obtuse angle relative to the first fibers when the composite material is in the retracted position, and the second fibers are oriented at an acute angle relative to the first fibers when the composite material is in the extended position.

18. The material of claim 13 wherein the first or second fibers in the fabric are twisted fibers impregnated with the matrix.

19. An axially stretchable, fiber-reinforced composite material stretchable between retracted and extended positions, comprising:
 an elastically deformable matrix made of an elastomeric material having a first modulus of elasticity in the range of approximately 10 psi-5000 psi;
 a planar fabric core having a side edge and a longitudinal axis parallel to the side edge, the fabric core comprising first fibers interlaced with second fibers in a selected weave pattern, the first and second fibers being impregnated and encapsulated within the matrix, wherein the first fibers being in a non-parallel orientation relative to the longitudinal axis, and the second fibers being in a non-parallel orientation relative to the first fibers when the material is in the retracted position, wherein the first and second fibers have a second modulus of elasticity exceeding approximately 2 Mpsi;
 wherein the composite material stretches axially toward the extended position upon application of an axial load parallel to the longitudinal axis, wherein the material has a non-linear modulus related to elongation of the material between the retracted and extended positions, and movement of the material toward the extended position causes the first and second fibers to rotate relative to each other and in a direction toward alignment with the longitudinal axis, and the matrix material biasing the composite material toward the retracted position.

20. The material of claim 19 wherein the first fibers and the second fibers are carbon fibers, and the second fibers are oriented at an obtuse angle relative to the first fibers when the composite material is in the retracted position, and the second fibers are oriented at an acute angle relative to the first fibers when the composite material is in the extended position.

* * * * *